United States Patent

[11] 3,553,384

[72] Inventors Pierre M. Lucas
20 Rue Tariel, Issy-Les-Moulineaux;
Jacques M. Dondoux, 1 Rue du Docteur
Magnan; and Jean F. Duquesne, 120
Rue de Javel, Paris, France

[21] Appl. No. 724,736
[22] Filed Apr. 29, 1968
[45] Patented Jan. 5, 1971
[32] Priority Apr. 28, 1967
[33] France
[31] No. 104648

[54] TELEPHONE SWITCHING UNIT WITH LOCAL AND REMOTE COMPUTER CONTROL
2 Claims, 5 Drawing Figs.

[52] U.S. Cl. 179/18
[51] Int. Cl. H04q 3/54
[50] Field of Search 179/18.211, 18SP

[56] References Cited
UNITED STATES PATENTS
3,403,383 9/1968 Kienzle et al. 179/18(.211)
3,365,548 1/1968 Lucas et al. 179/18(.211)

*Primary Examiner*—Kathleen H. Claffy
*Assistant Examiner*—Thomas W. Brown
*Attorney*—Abraham A. Saffitz

ABSTRACT: A telephone switching system having a switching unit under the control of a local computer and a remote computer, each of said computers including a permanent program store having recorded therein the telephone switching phases for connect, disconnect and identification of the junctors and adapted to send noncyclical control signals to the switching unit, and a multiregister store having a plurality of store areas for temporary storage to record the state of test points, addresses and switching phases in the junctors and adapted to send cyclical test signals to the switching unit. When the local computer is in order, it is it which controls the switching unit. When the local computer is out of order, the switching unit is controlled by the remote computer. A processor is inserted between the switching unit and the remote computer and includes a buffer store for conveying in transit the noncyclical signals from the remote computer to the switching unit and means for generating in the processor proper the test cyclical signals to the switching unit upon reception of specific signals from the remote computer.

INVENTORS:

Pierre M. LUCAS,
Jacques M. DONDOUX
and Jean F. DUQUESNE
By Abraham A. Saffitz
ATTORNEY

INVENTORS:

Pierre M. LUCAS,
Jacques M. DONDOUX
and Jean F. DUQUESNE
By Abraham A. Saffitz
ATTORNEY

INVENTORS:

Pierre M. LUCAS,
Jacques M. DONDOUX
and Jean F. DUQUESNE

By Abraham A. Saffitz
ATTORNEY

INVENTORS:
Pierre M. LUCAS,
Jacques M. DONDOUX
and Jean F. DUQUESNE
By Abraham A. Saffety
ATTORNEY

TELEPHONE SWITCHING UNIT WITH LOCAL AND REMOTE COMPUTER CONTROL

The present invention generally relates to telephone switching units controlled by electronic computers and more particularly to a simplified processor associated with the switching unit and allowing it to be controlled either by a local computer or, in case of breakdown of the latter, by a distant computer through the processor.

Switching units controlled by electronic computers are known in the art. Such a switching unit is disclosed in U.S. Pat. No. 3,497,630 issued Feb. 24, 1970. They generally comprise two stores, a general permanent program store (designated by 1 in the above patent) containing instructions to be undertaken in dependence upon the happening or nonhappening of an expected new event in the march of the setting up of a telephone communication and temporary stores (designated by 5 in the above patent) respectively associated with the junctors of the switching unit. These temporary stores are specific areas or word areas of a single temporary store; a word area is usually called a register and the temporary store is consequently called a multiregister.

At a given time the computer is processing a particular register associated with a particular junctor according to a phase of the permanent program store. During the development of the phase, certain bits written in the concerned register may change due to events that occurred during the phase. Such event can be the arrival of a signal at one or the other sides of a supervised junctor (calling subscriber's side or called subscriber's side), the reply to an order or to a previous interrogation by an external circuit such as the switching network, a magnetic drum with which the computer is associated, or the expiry of a predetermined delay. Consequently each program phase relating to a given register is followed by the same phase or a different phase relating either to the subsequent register or to the same register.

The series of the program phases and the composition of the register words associated with the junctors are given in the patent above referred to. It is sufficient for the understanding of the present invention to state that the information relating to a register of the multiregister are of two kinds, namely principally the address of the junctor with which the register is temporarily associated and the code of the phase actually being processed on the one hand and the state or condition of testing points in the junctor. For example, during dialling the condition of the calling line connected to the junctor is periodically tested and a one or a zero is written into the register according to the result of the test. In the following, the multiregister in the computer associated with the switching unit will be represented as a single block and the register store in the processor also associated with the switching unit will be shown in two blocks, the first concerned with the junctor, addresses and phase information, the second with the test point states.

A switching unit, for reasons of safety and continuity of operations, is generally controlled by two computers or local decision-making circuits, each having a sufficient capacity to deal with the complex telephone functions, the diversity of the lines and circuits involved and with the special telephone services. This expensive solution can be fully justified only in the case of large-capacity automatic switching units.

The object of the invention is to enable an automatic switching unit to operate under the control of either local or remote computers, with all possible combinations.

One characterizing feature of the invention is that the automatic switching unit is controlled by the remote computer through the intermediary of a simplified processor, linked with the switching unit in the same manner as the local computer, being connected thereto by a two-way link and having a link by way of a special data-transmission channel with the remote computer capable of servicing several similarly simplified processors.

According to the invention, the said simplified processor comprises a programmer whose functioning is regulated by a phase register, a store associated with said programmer and divided into a buffer store, and a junctor phase and state store, a scanner exploring the condition of the junctors of the switching network, a distributor for actuating said junctors and means to effect the transit of information between the remote and local logical decision-making circuits, said switching network and its possible satellite exchanges, and further to execute, in accordance with the instructions coming from said remote logical decision-making circuit simple reading, writing and test operations, as well as cyclical programs in connection with the scanning and distribution functions.

The invention will now be explained with reference to the accompanying drawings, in which;

FIG. 5 is a sketch showing how to place side by side FIGS. 1, 2 and 3 in order to form the block diagram of the switching unit and its control system.

Figure 1:
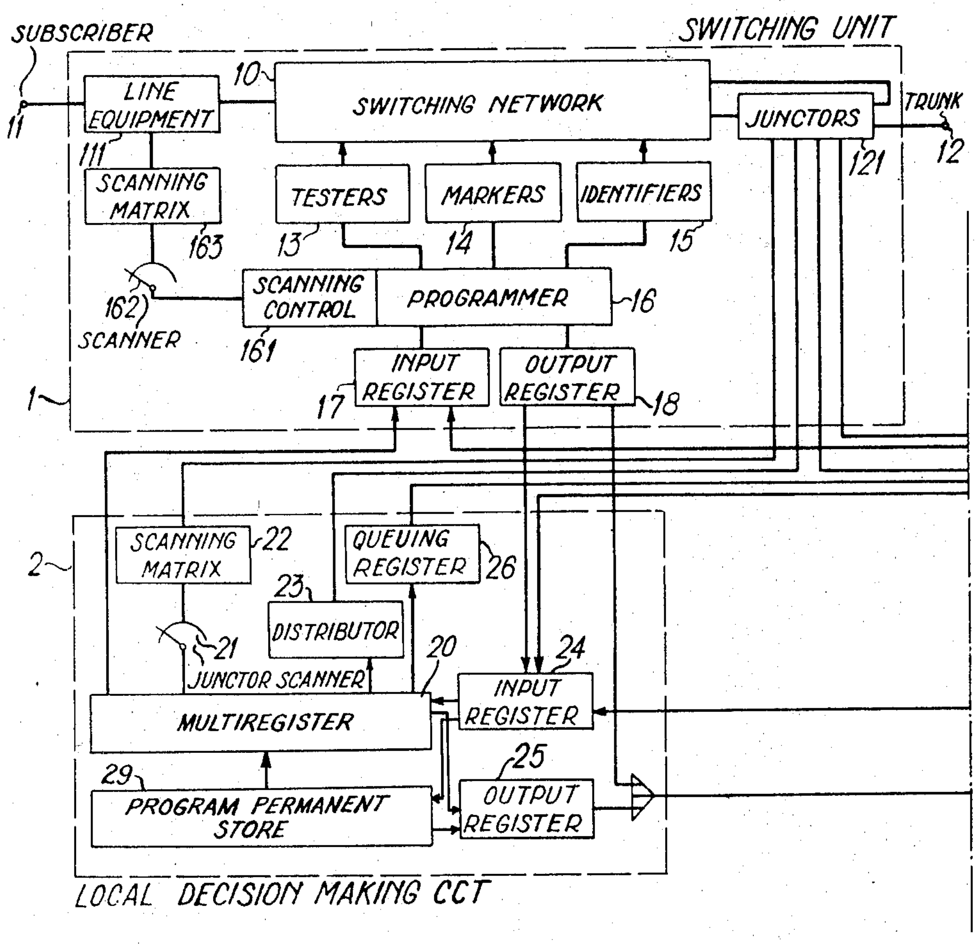
FIG. 1 represents in block diagram form the automatic switching unit and the local decision making circuit.
Figure 2:
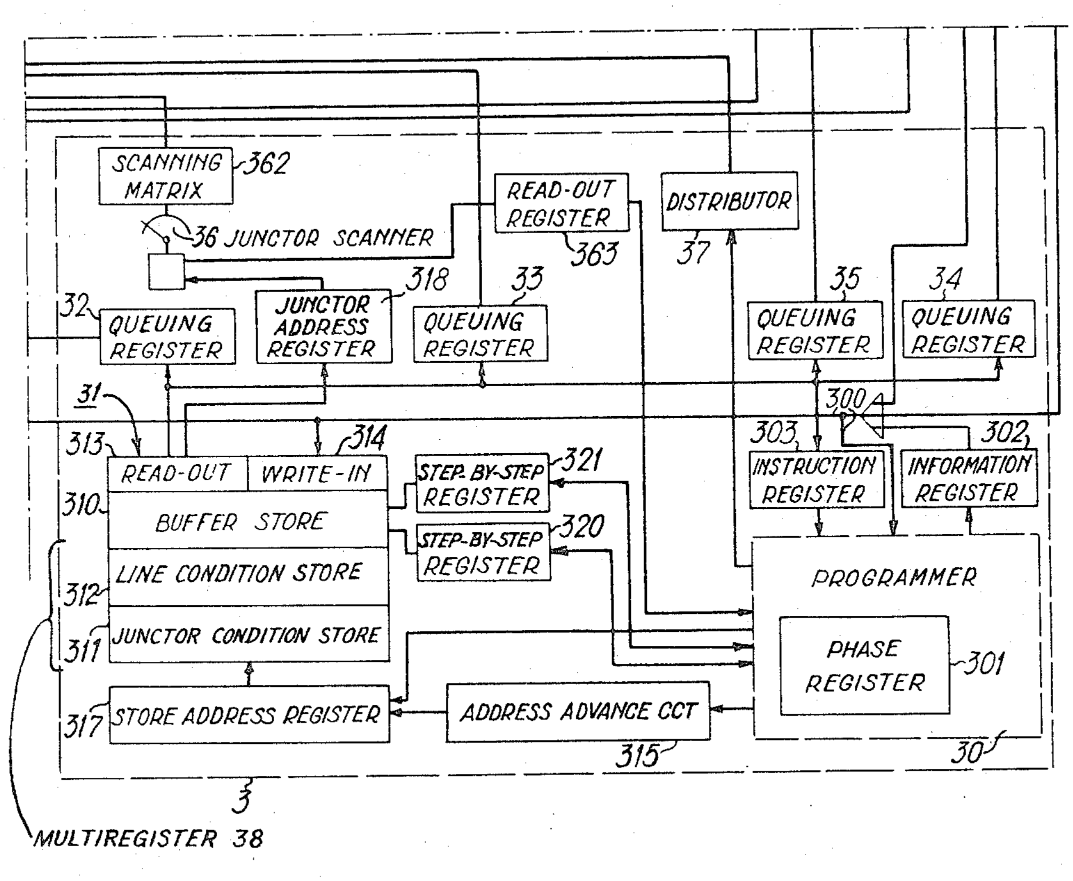
FIG. 2 represents the processor.
Figure 3:
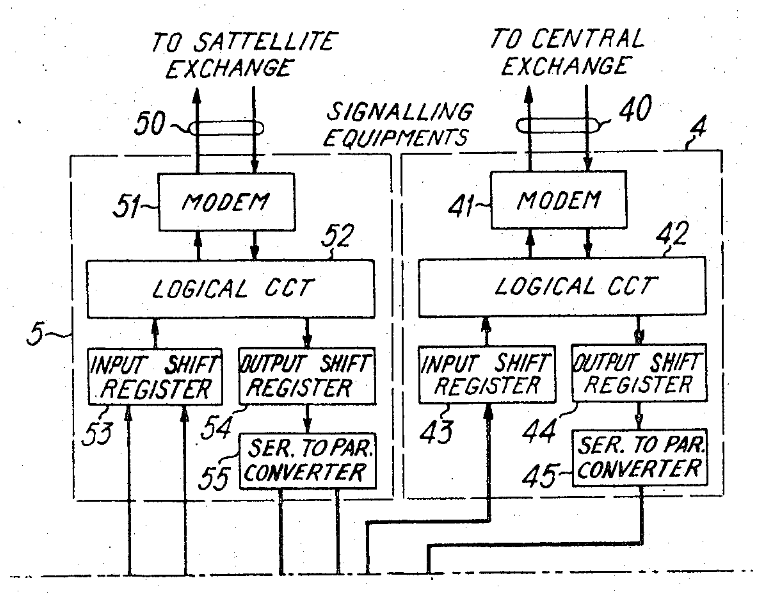
FIG. 3 represents the signalling units.
Figure 3:
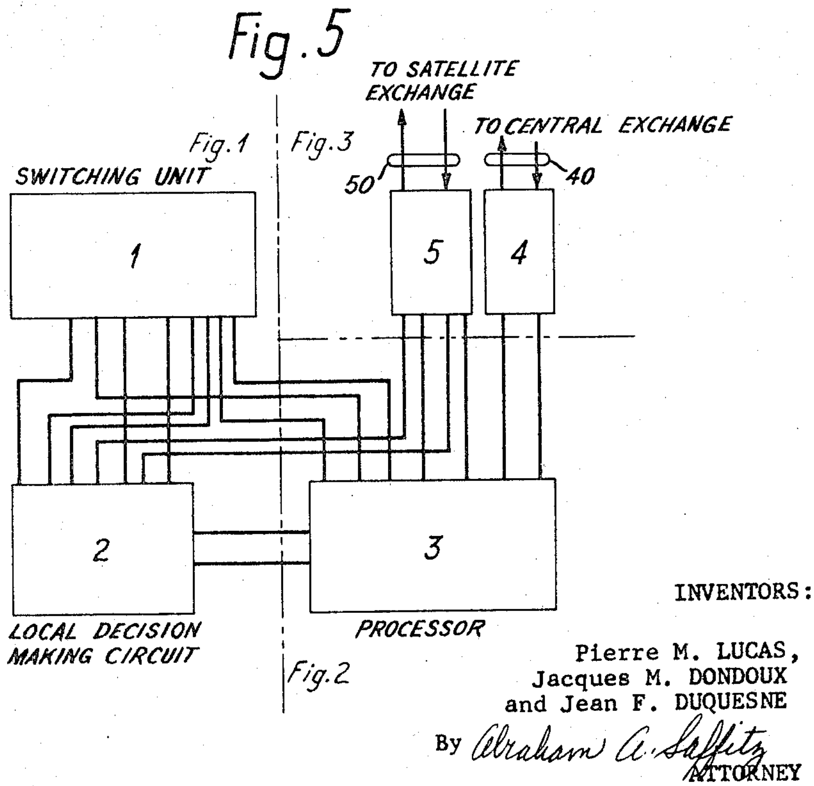

FIG. 5 shows an automatic switching unit 1, a local decision-making circuit 2, a simplified processor 3 in two-way connection for data transmission with a connecting central exchange (not represented) via a signalling unit 4 and a data transmission channel 40 through which it receives instructions from a remote logical decision-making circuit located in said connecting central exchange and identical to 2 and supplies informations thereto. Furthermore, a satellite exchange is connected to processor 3 and local decision-making circuit 2 by way of a signalling unit 5 and a data transmission channel 50 similar to the foregoing.

Referring now to FIG. 1, the switching unit 1 comprises in a known manner a switching network 10 to which are connected the subscriber incoming lines such as 11 through line equipments such as 111 and trunks or subscriber outgoing lines such as 12 through the intermediary of junctors 121. The switching network 10 has associated therewith testers 13, markers 14 and identifiers 15 controlled by a programmer 16 which also controls, through a special scanning control circuit 161, a cyclic scanner 162 for the subscriber equipments 11, whose exploring points are assembled in a matrix 163. An input register 17 and an output register 18 establish a two-way connection between the programmer 16, the local decision-making logic circuit 2 and the simplified processor 3.

The local decision-making logic 2 comprises a permanent program store 29 and a multiregister 20 associated with said permanent program store 29. Multiregister 20 is connected to the junctors 121 by a junctor scanner 21 associated with a scanning matrix 22, and by a junctor distributor 23. The program store 29 and the multiregister 20 are also connected to the input register 17 and output register 18 of the programmer 16 to the signalling equipment 5 and the simplified processor 3 through an input register 24, to the simplified processor 3 through an output register 25, and to the signalling equipment 5 through a queuing register 26.

The signalling equipments 4 and 5 are similar. Each of these comprises a modulator-demodulator 41 or 51 which connects the data-transmission channel 40 or 50 to transmission logic 42 or 52. To these logical circuits are connected two shift registers, one for input 43 or 53, the other for output 44 or 54, with which a series to parallel converter 45 or 55 is associated.

The simplified processor 3 comprises a programmer 30 whose functioning is directed by a phase register 301 and which is associated with a store 31 divided into three distinct working areas, namely a buffer store 310, a junctor condition store 311 and a line-condition store 312, these two latter stores forming a multiregister 38, with which there are associated a readout circuit 313 and a writein circuit 314. The latter is connected to the output registers 18 of the switching unit 1, register 25 of the local decision-making circuit 2, series to parallel converters 45 and 55 of the signalling equipments 4 and 5, and, by the intermediary of a register 302 for processed data, with the programmer 30. The readout circuit 313 is linked through the queuing register 32 with the input register 24, through the queuing register 33 with the input register 17, through the queuing registers 34 and 35 with the input registers 43 and 53 and through an instruction register 303 with the programmer 30.

The registering areas or registers which constitute the junctor condition store 311 are designated successively by a store address register 317 which the programmer 30 operates step-by-step by means of an advance circuit 315. That part of this information which indicates the address of the junctor is transferred from the readout circuit 313 to a junctor address register 318 which controls the junctor scanner 36 associated with a scanning matrix 362 of the junctors 121. A readout register 363 connects the scanner 36 to the programmer 30, which in turn is connected to the junctors 121 by a distributor 37. The store address register 317 is thus employed in step-by-step advance to effect the supervision of the registering areas of store 311; address register 317 can also be positioned directly by the programmer 30 to designate any address in the store 31.

It is to be noted that junctor scanner 36 of processor 3 is a duplicate of junctor scanner 22, scanning matrix 362 is a duplicate of scanning matrix 22 and distributor 37 is a duplicate of distributor 23.

The three sections 310, 311, and 312 of store 31 are organized as follows:

The line condition store 312 and the junctor condition store 311 contain a binary digit for each reflective exploring point of the matrix 163 (line idle or engaged) and of the matrix 362 (junctor idle or engaged).

The stores 311 and 312 comprise:

a. one pigeonhole per register for receiving a signalling message from the junctor or line associated with said register through scanner 36 or 162;
b. one pigeonhole per register for transmitting a signalling message to the junctor associated with said register through distributor 37.

The buffer store comprises:

a. A queuing file of pigeonholes for the messages to be transmitted to the remote decision-making circuit through the signalling equipment 4; this queuing file is associated with two shift registers 320 and 321 which designate respectively the first pigeonhole to be used and the first pigeonhole available;
b. A queuing file of pigeonholes for the messages received from the remote decision-making circuit specialized according to the address of the message, namely:
   - one pigeonhole for the local decision-making circuit 2;
   - one pigeonhole for the switching unit programmer 16;
   - as many pigeonholes as there are signalling units such as 5, i.e. satellite exchanges attached to the automatic switching unit;
   - one pigeonhole for the reception of each type of control instruction of the programmer 30, thus for example four for the starting instructions of a cyclic program, for the reading-out of a word from the store, for the writing-in of a word into the store and for the testing of a group of exploring points.

The principal functions of the automatic switching unit are shared between the programmer 16 of the switching unit 1, the programmer 30 of the simplified processor 3 and the decision-making logic circuits, either local 2 or remote and located at the connecting central exchange so that the switching network, its markers, testers and identifiers as well as the signalling units such as 5 have the same functions, receive the same instructions and supply the same information in all cases.

The control programmer 16 of the switching unit 1 carries out the following fundamental functions:

- cyclic scanning of the line equipment 111 by the scanner 162 to detect the service requesting conditions;
- engagement test of a line 11 of a given address and selection of a route available between two given terminal addresses by means of the testers 13;
- connection of a route available determined between two terminals by means of the markers 14;
- identification of the line connected through the switching network 10 to another line of a given address, by means of the identifiers 15;
- disconnection of a route terminating at a line 11 of given address;

The programmer 30 of the simplified processor 3 carries out the following fundamental functions:

- transmission to the switching unit of the instructions coming from the connecting central exchange;
- transmission to the connecting central exchange of the informations supplied by the programmer 16;
- transmission in both directions of the informations exchanged between the multiregister 20 and the connecting central exchange;
- cyclic supervision of the service condition of the junctors 121 susceptible of indicating a request for service and not yet engaged in a communication;
- reception of operational instructions coming from the connecting central exchange and elaboration of the corresponding detailed signalling to be operated via the distributor 23;

The programmer 16 exchanges with the programmer 30 the same messages as it exchanges with the multiregister 20, each of which messages initiates a particular sequence of fundamental functions. The messages of the simplified processor 3 to the switching unit 1 are instructions for connecting, disconnecting or identifying a given line. The messages of the switching unit 1 to the simplified processor 3 are reports of execution of previous orders of connection, disconnection and identification or informations concerning the requests for service of the lines. They are exchanged in one direction through the queuing register 33 and the input register 17, in the other direction through the output register 18 and the writing-in circuit 314.

The programmer 30 and the remote decision-making circuit also exchange messages through the signalling equipment 4 on the data-transmission line 40 which links the automatic switching unit to the central exchange. These are, on one hand, the messages exchanged between the switching unit 1 and the simplified processor 3, and, on the other hand, messages relative to the functioning of the latter, i.e. from the remote decision-making circuit to the simplified processor, instructions for supervising or acting upon an element via the distributor 37 and instructions for initiating cyclic operations and, in the reverse direction, informations relating to said supervised element. The programmer furthermore ensures the transit of messages between the remote decision-making circuit and the local decision-making circuit 2 and the satellites.

The operating program of the programmer 30 is decomposed into cycles executed either individually or sequentially according to various phases, each of which corresponds to a particular function, to which a predetermined priority is assigned.

Each program cycle is executed in several basic steps, for example six, under the control of a conventional time base comprised in the programmer. The activities of each cycle will depend on the state of the phase register and are followed by a request for the next cycle, which consists in selecting among the recorded requests the one with the highest priority and to set the phase register accordingly.

Figure 4:
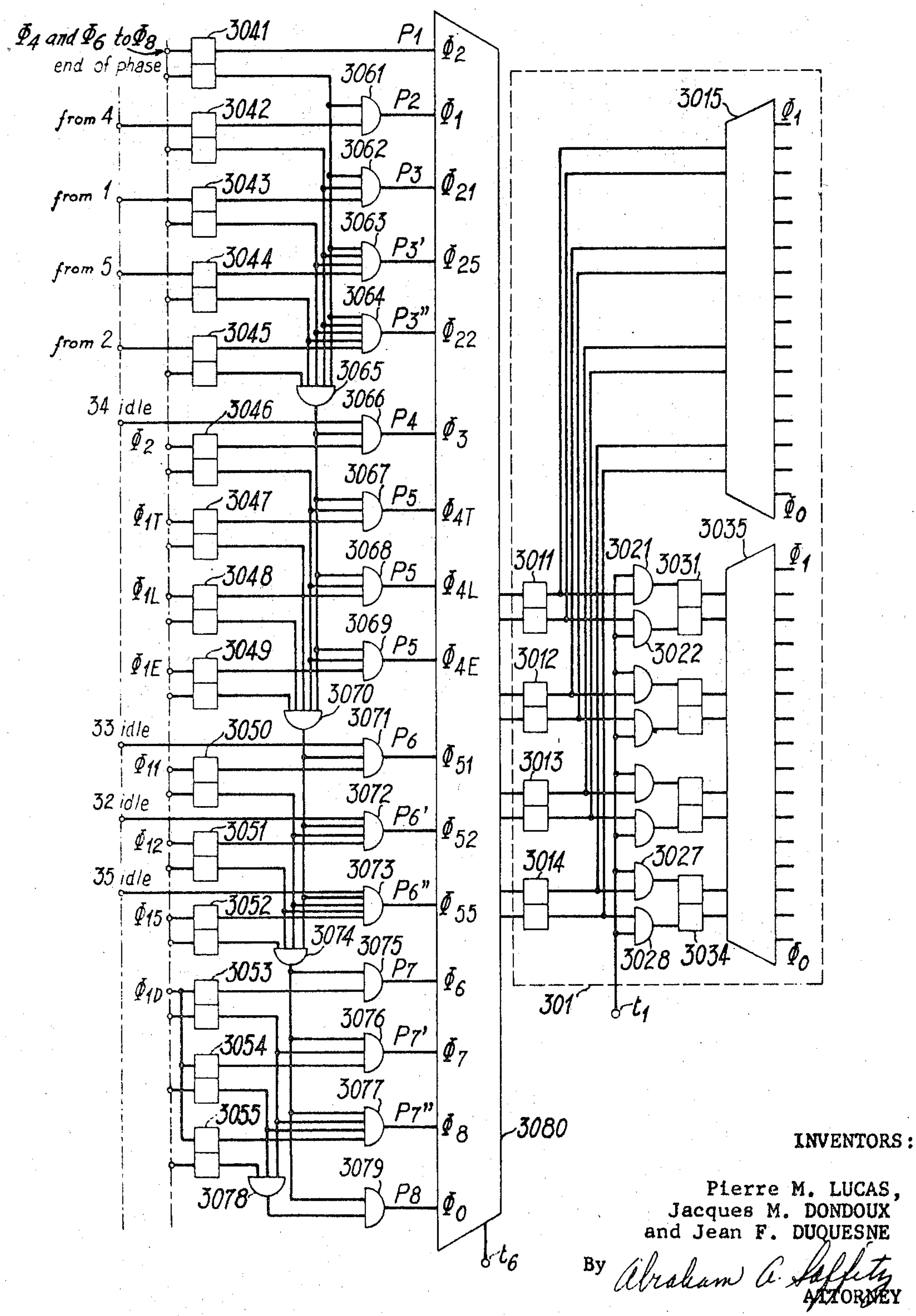
FIG. 4 represents in detail the phase register of the programmer of the processor.

FIG. 4 shows the phase register 301 and that part of the programmer which serves for its setting.

Taking for example sixteen as being the number of phases, the phase register comprises four input multivibrators 3011—3014, whose outputs are connected to the eight inputs of a decoder 3015 and are further connected by the AND gates 3021—3028 to the corresponding inputs of a second register formed of four multivibrators 3031—3034 the outputs of which are connected to the eight inputs of a decoder 3035. The multivibrators 3011—3014 being set at the last period $t_6$ of each cycle, the multivibrators 3031—3034 are set at time $t_1$ of the next cycle and the decoders 3015, 3035 are used as output of the phase register 301, the first during the first period of each cycle and the second during the following periods.

The phase register 301 is set in accordance with the requests received after activation of the multivibrators 3041—3055, according to the priorities $P_1$ to $P_8$ defined by a set of AND gates 3061—3079 by the intermediary of a coder 3080, whose eight outputs control respectively the activating and deactivating inputs of the multivibrators 3011—3014, said outputs being simultaneously unblocked at the last period $t_6$ of each cycle of the programmer 30.

The multivibrators 3041—3052 call for phases with a single cycle, while the multivibrators 3053—3055 call for phases with repetitive cycles. Each of the multivibrators 3041—3055 is set to rest at the end of the phase whose initiation it controls. The single-cycle phases may call for another phase which will be executed in this manner as soon as its starting conditions appear. The set of several single-cycle phases, each of which calls for the next phase until the initiated function is completed, constitutes a sequence.

The single-cycle phases may be classified in five types:

$\Phi_1$ RECEPTION CYCLE

Processor 3 receives a message from the central exchange.

This cycle results from the activation of the multivibrator 3042 of the processor by a signal coming from the remote decision logic circuit via the signalling equipment 4 and lead 300. It will be executed only when the multivibrator 3041 marking the end of the preceding phase being at rest, the gate 3061 defining the second-rank priority $P_2$ is open. IT comprises the following operations:

- reading of the address of the message defined by a fraction of the word in converter 45 and consequent setting of the address register 317 to designate the location of the word in the buffer store 310;
- activation of the appropriate calling multivibrator with regard to the following events, i.e. if the message is an instruction $\Phi_{11}$ towards the switching unit 1, multivibrator 3050, an instruction towards the local decision-making circuit 2, multivibrator 3051, an instruction $\Phi_{15}$ towards the signalling equipment 5, multivibrator 3052, if the message is a test instruction $\Phi_{1T}$, a reading instruction $\Phi_{1L}$ or writing instruction $\Phi_{1E}$ to a specific address of store 31 the multivibrator 3047, 3048 and 3049 respectively, and if the message is a start instruction $\Phi_{1D}$, the three multivibrators 3053, 3054, 3055 simultaneously;
- reading of the store area in the buffer store 310 whose address is written in register 317 and verification of its availability; if this address is not available, passing to the other requests in the queue;
- in case of availability, writing the contents of converter 45 at this address in the buffer store 310. The writing phase $\Phi_{1E}$ also embraces the case of the allocation of a junctor, i.e. the passing of the designated junctor into the supervisory state, and that of the instruction for an operation of the distributor 37. The writing is then effected in the junctor condition store 311.

$\Phi_2$ QUEUING FILE CYCLES

The information data to be transmitted to the central exchange are put in a queuing file before being transmitted.

The cycles of this type are initiated by the activation of one of the multivibrators 3041, 3043, 3044 and 3045, according to whether the information to be transmitted originates from programmer 30, switching unit 1, signalling equipment 5 or local decision-making circuit 2.

The multivibrator 3041 is activated in consequence of one of the phases $\Phi_4$, $\Phi_6$ to $\Phi_8$ to bring about the writing into the queuing file of an answer to an instruction coming from the remote decision-making circuit or of an event revealed by one of the phases with repetitive program, the corresponding answer being present in the information register 302. The execution of the resulting phase $\Phi_2$ is of first-rank priority $P_1$. The multivibrators 3043, 3044, 3045 are respectively activated by the switching unit 1, the signalling equipment 5 and the local decision-making circuit 2 when the information to be emitted is respectively located in output register 18, converter 55 and output register 25. The priority ranks $P_3$, $P_3'$ and $P_3''$ are allocated to the phases $\Phi_{21}$, $\Phi_{25}$ and $\Phi_{22}$ resulting therefrom. The cycles of this type comprise the following operations:

- transfer of the address of the first available pigeonhole in the queuing file from step-by-step register 321 to address register 317;
- reading of the corresponding word and verification of the availability of the pigeonhole;
- writing in this pigeonhole the content of register 302, register 18, converter 55 or register 25 depending on which of the multivibrators 3041, 3043, 3044 or 3045 was activated in their order of priority; together with a few binary elements for identifying the origin of the answer;
- advancing the step-by-step register 321 by one step;
- activating the multivibrator 3046 to call the following phase:

$\Phi_3$ TRANSMISSION CYCLE

This cycle, whose priority $P_4$ ranks immediately behind $P_3''$, can be initiated only when the queuing register 34 is available. It comprises:

- the transfer of the address of the first word to be transmitted from the queuing file of address register 320 to the register 317;
- reading of the corresponding word which is written into the readout register 313;
- the transfer from readout register 313 to the queuing register 34 and transmission of a call signal to the signalling equipment 4;
- the erasure of the word thus transmitted from the queuing file;
- the stepping of step-by-step register 320.

At the end of the cycle, the multivibrator 3046 is reset to rest only if the two step-by-step registers 320 and 321 coincide, i.e. when the queuing file is empty.

When the transmission logic 42 is able to deal with the request addressed to it, it effects the transfer of the message waiting in the register 34 to the shift register 43 and proceeds with its transmission. The queuing register 34 is then free and a new transmission cycle can be executed if no request of a higher priority has been recorded.

$\Phi_4$ ACTUATION CYCLES

These phases $\Phi_{4T}$, $\Phi_{4L}$, $\Phi_{4E}$, initiated by the activation of the multivibrators 3047, 3048 or 3049 following the reception in phase 1 of a test instruction $\Phi_{1T}$, a reading instruction $\Phi_{1L}$ or a writing instruction $\Phi_{1E}$, are of fifth-rank priority $P_5$, without any order of precedence among them, due to the fact that they result from instructions originating from the same remote decision-making circuit and are not subjected to any particular conditions of availability.

a. Testing a group of exploring points:

The address of the group of exploring points to be tested which was comprised in the instruction received in $\Phi_{1T}$ and written into a specific location of the buffer store 310 whose address is introduced at the commencement of the cycle into the address register 317, is read and transferred from the readout register 313 to the junctor address register 318. The scanner 36 is directed towards the junctor to be tested and gives the result of the test via the reading-out register 363 to the programmer 30. The latter adds thereto a few binary elements indicating the origin of the data and writes it into the information register 302 while simultaneously calling on the queuing file phase by activating the multivibrator 3041.

b. Reading a stored word:

The word to be read whose store address is introduced at the beginning of the cycle into the register 317 is transferred from the reading register 313 to the instruction register 303 and then, through the programmer 30, which adds thereto a few binary elements to indicate its origin, to the information register 302. Programmer 30 then calls for the queuing file phase as above.

c. Writing a word into the store:

The address of the store where a word has to be written and the contents of said word being located in two consecutive word areas of the buffer store 310, the address of the first work (i.e. the address) is written into the register 317 and the result of the reading, i.e. the desired address, is transferred from the readout register 313 to the register 317 via the register 303 and the programmer 30 and the latter drive the advance circuit 315 forward by one step. The reading of the buffer store 310 at the new address supplied by the register 317 yields the word to be recorded. The latter is transferred from the reading register 313 to the writing register 314 via the instruction register 303, the programmer 30, and the information register 302. The information contained in the writing register 314 is then written into the store 31 at the address transmitted to the register 317 by programmer 30.

This writing phase, which comprises three requests to the store, is carried out in two consecutive and indissociable cycles, the second of which is called by the first with absolute priority.

$\Phi_5$ INSTRUCTION-TRANSFER CYCLES

The instruction-transfer phases $\Phi_{51}$, $\Phi_{52}$ and $\Phi_{53}$ towards the switching unit 1, the local decision-making circuit 2 or the signalling equipment 5, respectively, are initiated by the activation of the multivibrators 3050, 3051 or 3052 on reception in phase 1 of a transfer instruction $\Phi_{11}$, $\Phi_{12}$ or $\Phi_{15}$. Their execution is subject to the availability of the queuing registers 33 in direction of the switching unit 1, 32 in direction of the local decision-making circuit 2 and 35 towards the signalling equipment 5, respectively. Their priorities of respective ranks $P_6$ $P'_6$, $P''_6$ are therefore in the order of precedence indicated.

The buffer store 310 is read at the address indicated by the register 317 into which it was fed at the start of the cycle and the result of this reading-out is transferred from the readout register 313 to the queuing register 33, 32 or 35 depending on whether the multivibrator 3050, 3051 or 3052 has been activated, while simultaneously a call is addressed to the element involved, whereafter the word read in the buffer store 310 is erased from this store.

The repetitive cycle phases will now be disclosed:

The phases with repetitive cycles constitute a single sequence of four variants, namely $\Phi_6$, $\Phi_7$ and $\Phi_8$ and $\Phi_0$ (rest), whose initiation is effected by the reception of a special instruction $\Phi_{1D}$ activating simultaneously the three multivibrators 3053, 3054, 3055, the phase changes of which are determined in the order of priority assigned to them by internal cycle counts. Since all single-cycle phases whose conditions of initiation are fulfilled are of a higher priority, the phases with repetitive cycles which collect an information to be transmitted interrupt themselves by calling for a transmission cycle.

$\Phi_6$ Sequential processing of the registers for analysis of the signals received on the supervised junctors.

With each cycle of the program $\Phi_6$, the address of one of the registers of the junctor condition store 311 is elaborated in the address register 317 by the step-by-step advance circuit 315, the designated register is read and its content is transferred from the readout register 313 to the junctor address register 318 with regard to the part containing the address of the supervised junctor, and into the programmer 30 with regard to the information-containing part, via the register 303. The address of the junctor thus transferred into the register 318 allows firstly to direct the scanner 36 to the exploring point of the junctor concerned in matrix 362, and secondly to designate the binary digit of the junctor condition store 311 where the preceding condition has been registered, i.e. detected during the preceding test, of said exploring point. The test of the exploring point and the reading of its preceding state being effected simultaneously, their results appearing in the reading registers 363 and 313 are compared, and the programmer 30 deduces therefrom both the information for updating the junctor condition store 311 and the modifications of the information-containing part necessitated by the detected conditions. The new content of the register thus determined is then entered into the junctor condition store 311 at the address supplied by the address register 317.

At certain stages of the progressive analysis thus carried out by programmer 30, for example when a well defined signal has been recognized, the programmer 30 elaborates in the register 302 a message addressed to the remote decision making circuit to inform it of the recognition of the signal of the supervised junctor. The $\Phi$6-type program then calls for a queuing file program $\Phi_2$, wherein the message is transferred from the register 303 to the first available location of the queuing file of the buffer store 310 according to the address provided by the step-by-step register 321 and the output phase $\Phi_3$ is called.

$\Phi_7$ Cyclic supervision of the elements not already supervised for recognizing requests for service.

The cyclic scanning of the line equipments 111 is effected by the scanner 162 of the switching unit 1 itself and not by the local decision-making circuit 2. As the processor 3 is intended for replacing circuit 2 in case of breakdown, the search of the service requesting lines by processor 3 is made in the junctor stage and not in the line equipment stage.

With each cycle of program $\Phi_7$, whose periodicity is in general slower than that of program $\Phi_6$, the address of the first junctor in the junctor condition store is entered by programmer 30 into the address register 317 and the address is then allowed to advance by advance circuit 315. As in the preceding case, the answers of the store 311 and of the explorer 36 relative to the successive junctors appear simultaneously in the reading registers 313 and 363. The programmer 30 compares these answers, identifies the binary digits which are different and consequently have changed from the previous to the present scanning, writes these digits in the junctor condition store 311 at the address of the junctor concerned for updating the store.

At certain stages of this cyclic scanning, the programmer 30 generates in the register 302 a message addressed to the remote decision-making circuit to inform the latter that one of the nonsupervised junctors displayed a request for service. The output process of this message is the same as in the preceding case.

$\Phi_8$ Generation of the detailed instructions of the distributor 37

This program results from a global instruction recorded in the course of a reception phase $\Phi_1$, in a pigeonhole of the junctor condition store 311 reserved for instructions directed to the distributor 37. It is effected periodically until the complete operation has been carried out. For example, this operation may consist in the emission of a train of *n* pulses of 50 msecs, representing the emission of a decimal digit by a trunk junctor. With each periodic passage of this program, the programmer 30 reads in the location of the junctor condition store 311 containing the instruction, the address of the junctor to be energized and the phase of the junctor operation. If an elementary operation, such as the activation or deactivation of a signalling multivibrator in the junctor 121 must be carried out by the distributor 37, the address of the junctor to be controlled is transmitted thereto. When the whole operation is completed, the location of the store 311 where it was registered is erased.

In conclusion, the simplified processor 3 carries out functions which may be classed in two principal groups:

1. it ensures the simple information transit between the switching unit 1, the local decision making circuit 2, the signalling equipment 4 to the central exchange and the signalling equipment 5 to the satellite exchange by using its buffer store 310 as a turntable. A transit of this kind assumes two consecutive phases. In the first, the information passes from an output register or converter of the originating functional circuit (1, 2, 4, 5) to a location of the buffer store, and in the second it passes from the buffer store to the queuing register of the functional circuit to which it is addressed. The two phases are characterized by the fact that they are very short and that their initiation is random because it depends on the conditions of decision or of the availability of the programmer 30. A particular information transit is the case where the addressee of the information is the programmer 30 itself, to which the remote decision making circuit forwards an instruction. These phases are of the type $\Phi_1$ to $\Phi_5$.

2. the processor executes its own cyclic programs in connection with test scanning and actuation distribution functions. These programs are originated by an instruction coming from the remote decision making circuit, namely: instruction for supervision of a given junctor by a register, instruction for a complex operation to be executed by the distributor, instruction initiating a cyclic supervision program at a given instant. Once initiated, these programs are executed cyclically according to their predetermined periodicity. They include phases $\Phi_6$, $\Phi_7$ and $\Phi_8$.

These two classes of functions involve only elementary logical decisions, the complex logical decisions being elaborated either by the remote decision making circuit or, independently, by the local decision making circuit 2. The result is, that the structure of the simplified processor is very simple and economical, without thereby imposing any restrictions with regard to the flexibility and reliability of the system.

We claim:

1. A telephone switching system comprising in combination:

i. a switching unit including a crosspoint switching network, junctors, a programmer, means for connecting, disconnecting and testing said crosspoints controlled by said programmer, switching unit input and output registers associated with said programmer;

ii. a local computer and a remote computer for controlling said switching unit, each including a program store having recorded therein telephone switching operation phases, a multiregister store having a plurality of store areas respectively associated with the junctors and having recorded therein the state of test points in the junctors, the addresses thereof and the telephone switching phase undergone thereby, means for applying noncyclical switching signals to the switching unit programmer and receiving response signals therefrom respectively via the switching unit input and output registers, means for applying cyclical testing and actuating signals to said junctors, means for writing into said multiregister store the testing and actuating result signals and computer input and output registers associated in the local and remote computers with both the program and multiregister stores; and iii. a processor inserted between said switching unit and said remote computer including a buffer store, a multiregister store having a plurality of store areas respectively associated with the junctors and having recorded therein the state of test points in the junctors, the addresses thereof and the telephone switching phase undergone thereby, means for applying cyclical testing and actuating signals to said junctors, means for writing into said multiregister store the testing and actuating result signals, processor input and output registers associated with said processor and respectively connected to the input and output registers of the switching unit and the computers, means for conveying in transit through said buffer store the switching noncyclical signals sent by the remote computer to the switching unit programmer, means for storing in said buffer store specific signals sent by the remote computer to the processor and means for initiating in response to said specific signals the cyclical testing and actuating signal applying means in said processor.

2. A telephone switching system as claimed in claim 1, wherein the specific signals sent by the remote computer to the processor and stored in the storing means thereof include a first specific signal initiating the cyclical testing and actuating signal applying means of said processor, and wherein said processor further includes means for transmitting the testing signals and the actuating result signals which are stored in said processor multiregister store in response to said second specific signal.